(12) United States Patent
Divigalpitiya et al.

(10) Patent No.: US 6,809,280 B2
(45) Date of Patent: Oct. 26, 2004

(54) PRESSURE ACTIVATED SWITCH AND TOUCH PANEL

(75) Inventors: Ranjith Divigalpitiya, London (CA); David E. Livingstone, Harrietsville (CA); Robert S. Moshrefzadeh, Oakdale, MN (US); Elisa M. Cross, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

(21) Appl. No.: 10/138,349

(22) Filed: May 2, 2002

(65) Prior Publication Data

US 2003/0205450 A1 Nov. 6, 2003

(51) Int. Cl.[7] ................................................. H01H 3/00
(52) U.S. Cl. ...................................... 200/512; 200/5 A
(58) Field of Search ............................... 200/5 A, 512; 178/18.01, 18.02, 18.03, 18.04, 18.05, 18.06, 18.07, 18.1; 345/173–179

(56) References Cited

U.S. PATENT DOCUMENTS

| | | | |
|---|---|---|---|
| 3,699,294 A | 10/1972 | Sudduth | 200/166 C |
| 4,098,945 A | 7/1978 | Oehmke | 428/327 |
| 4,164,634 A | 8/1979 | Gilano | |

(List continued on next page.)

FOREIGN PATENT DOCUMENTS

| | | | | |
|---|---|---|---|---|
| DE | 41 14 701 | 11/1992 | ............ | H01R/4/58 |
| EP | 1 172 831 | 1/2002 | ............ | H01H/13/70 |
| GB | 2 049 290 | 12/1980 | ............ | H01H/13/90 |
| GB | 2 233 499 | 1/1991 | ............ | H01H/13/52 |
| JP | 59-188726 | 10/1984 | ............ | G06F/3/033 |
| JP | 60-65406 | 4/1985 | | |
| JP | 1-132017 | 5/1989 | ............ | H01H/13/76 |
| JP | 93-143219 | 6/1993 | ............ | G06F/3/03 |
| JP | 95-219697 | 8/1995 | ............ | G06F/3/03 |
| JP | 95-296672 | 11/1995 | ............ | H01N/13/02 |
| JP | 2000-029612 | 1/2000 | ............ | G06F/3/03 |
| JP | 2001-228975 | 8/2001 | | |
| WO | WO 00/00563 | 1/2000 | ............ | C09J/9/02 |

OTHER PUBLICATIONS

Fulton, J.A., et al.; Electrical and Mechanical Properties of a Metal–Filled Polymer Composite for Interconnection and Testing Applications; AT&T Bell Laboratories;0569–5503/89/0071.

U.S. patent application Ser. No. 10/008,468, Method and Apparatus for Making Particle–Embedded Webs, filed Nov. 9, 2001.

*Primary Examiner*—Michael A. Friedhofer
(74) *Attorney, Agent, or Firm*—Robert J. Pechman

(57) ABSTRACT

The present invention provides a switchable pressure activated electronic device. The switchable electronic device includes a composite material disposed between two conductors. The composite material electrically connects the two conductors when pressure is applied between them, and electrically isolates the two conductors when pressure is not applied between them. The composite includes conductive particles at least partially embedded in an insulating material. The conductive particles are disposed so that substantially all electrical connections made between the first and second conductors are through single particles.

45 Claims, 4 Drawing Sheets

U.S. PATENT DOCUMENTS

| | | | |
|---|---|---|---|
| 4,421,958 A | 12/1983 | Kameda | 200/5 A |
| 4,575,580 A | 3/1986 | Jandrell | 178/18 |
| 4,644,101 A | 2/1987 | Jin et al. | 178/18 |
| 4,775,765 A | 10/1988 | Kimura et al. | 178/18 |
| 4,914,416 A | 4/1990 | Kunikane | 338/114 |
| 4,963,417 A | 10/1990 | Taniguchi et al. | 428/327 |
| 5,209,967 A | 5/1993 | Wright et al. | 428/283 |
| 5,243,162 A | 9/1993 | Kobayashi | 200/512 |
| 5,371,327 A | 12/1994 | Fujinami et al. | 174/257 |
| 5,898,426 A | 4/1999 | Kim | 345/173 |
| 5,986,223 A | 11/1999 | Kim | 178/18.01 |
| 5,995,198 A | 11/1999 | Mizutani | 355/53 |
| 5,997,996 A | 12/1999 | Tamura | 428/209 |
| 6,073,497 A | 6/2000 | Jiang et al. | 73/862.68 |
| 6,078,274 A | 6/2000 | Inou | 341/34 |
| 6,088,024 A | 7/2000 | Yamagata | 345/173 |
| 6,114,645 A | 9/2000 | Burgess | 200/512 |
| 6,118,435 A | 9/2000 | Fujita et al. | 345/173 |
| 6,310,614 B1 | 10/2001 | Maeda et al. | 345/173 |
| 6,355,895 B1 * | 3/2002 | Crowley et al. | 200/512 |
| 6,369,803 B2 | 4/2002 | Brisebois et al. | |
| 6,483,055 B1 * | 11/2002 | Tanabe et al. | 200/85 A |
| 6,522,322 B1 * | 2/2003 | Maeda et al. | 345/173 |

* cited by examiner

PRESSURE ACTIVATED SWITCH AND TOUCH PANEL

The present invention relates generally to pressure activated switch devices and touch panel devices, and to materials useful for closing and opening electrical connections in such devices due to the application or cessation of pressure.

BACKGROUND

Touch screens and membrane switches provide convenient user interface devices that can be activated by a touch such as from a finger, stylus, or other appropriate object. In many applications, these devices function by detecting a signal when otherwise separated conductive films, electrodes, or circuits are brought together under the application of pressure by the user.

SUMMARY OF THE INVENTION

The present invention provides a switchable pressure activated electronic device that includes a first conductor that is movable toward a second conductor and a composite material disposed between the first and second conductors for electrically connecting the first and second conductors under application of sufficient pressure therebetween and for electrically isolating the first and second conductors in the absence of such sufficient pressure. The composite material includes a plurality of conductive particles at least partially embedded in an electrically insulating layer. The plurality of conductive particles have no intended relative orientation and are disposed so that substantially all electrical connections made between the first and second conductors are through single particles.

The present invention further provides a switchable pressure activated electronic device that includes a composite layer that includes a plurality of substantially spherical conductive particles disposed so that substantially none of the conductive particles are in physical contact, where the composite layer is disposed between two conductors and has a thickness that reversibly decreases upon application and cessation of sufficient force applied between the conductors to allow electrical connection of the conductors through one or more of the conductive particles during application of sufficient force and to allow electrical isolation of the conductors during cessation of sufficient force.

The present invention also provides a switchable pressure activated electronic device that includes a first conductor, a second conductor, means for electrically connecting the first conductor to the second conductor upon application of sufficient pressure, and means for electrically isolating the first conductor from the second conductor upon cessation of sufficient pressure.

The present invention still further provides a method of making a switchable pressure activated electronic device that includes dispersing a plurality of conductive particles, at least partially embedding the conductive particles in a layer of insulating material, and disposing the layer of insulating material and conductive particles between a first conductor and a second conductor so that the first and second conductors are electrically connected through one or more single particle contacts upon application of sufficient pressure, and the first and second conductors are electrically isolated upon cessation of sufficient pressure.

The present invention further provides a film for use in an electronic switch that has a thickness that reversibly decreases with pressure, and that includes a plurality of randomly positioned conductive particles at least partially embedded in the layer. The particles are distributed so that, for substantially all positions across the layer, there is at most a single particle through the thickness of the layer.

The present invention yet further provides an electronic switch that includes a first conductor that is movable toward a second conductor, and a plurality of substantially randomly positioned conductive particles disposed between the first and second conductors, where the first conductor is electrically isolated from the second conductor in the absence of sufficient pressure therebetween and the first conductor in electrical contact with the second conductor through one or more single particle connections when sufficient pressure is applied therebetween.

Also provided is a display system that includes a display viewable through an electronic switch of the present invention.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
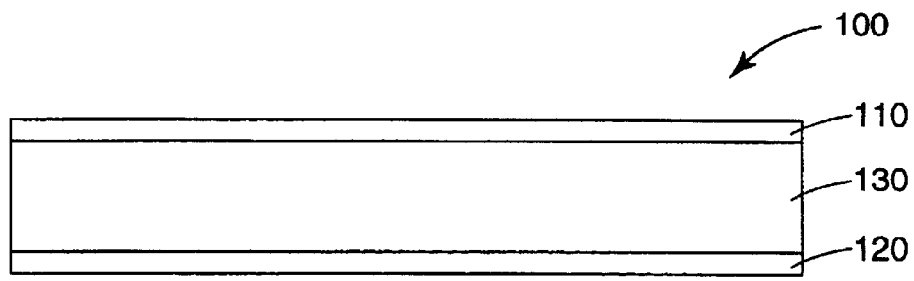
FIG. 1 is a schematic side view of a pressure sensitive electronic device.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention relates to switchable pressure activated electronic devices such as membrane switches and touch sensors. Switchable pressure activated electronic devices are devices that can be reversibly activated by repeated application and cessation of a sufficient pressure. In devices of the present invention, sufficient pressure is that pressure that, when applied between conductors, causes an electrical contact to be made between the conductors, which electrical contact allows a signal to be measured by the device. Electrical contact includes direct physical contact between or among the subject conductive elements as well as electronic coupling between or among the subject conductive elements regardless of whether physical contact is made, for example via capacitive coupling.

To make the electrical connection between the conductors, the present invention employs conductive particles distributed between the conductors in such a manner that substantially all electrical contacts are through one or more single particles, in other words both conductors are in simultaneous electrical contact with the same particle or particles. The conductive particles are at least partially embedded in an insulating material that allows the electrical connection to be broken when sufficient pressure between the conductors no longer exists. For example, the insulating material can be a resilient material that can be deformed to allow electrical contact to be made upon the application of pressure and that returns the conductors to their initial, separated positions when no pressure is applied.

Distributing the conductive particles so that electric contacts are made via one or more single particles has several benefits. Because the conductors are in electrical contact via single particles, there are at most only two contact points to contribute to contact resistance for each particle contact (a conductive particle contacting the top conductor is one contact point, and the same conductive particle contacting the bottom conductor is another contact point), and this number of contact points remains consistent for each activation of a particular device. This can result in a relatively low contact resistance and a more consistent, reliable, and reproducible signal every time the device is activated. Lower contact resistance gives rise to less signal loss, which ultimately results in a higher signal to noise ratio, which can result in more accurate positional determinations, for example in touch sensor devices. When contacts are made through a chain of multiple particles, it is possible for the lateral position at which electrical contact is made with the upper electrode to be offset from the lateral position at which electrical contact is made with the lower electrode when the particles through which the contacts are made are not perfectly vertically aligned (i.e., aligned in the thickness direction of the device). This can lead to positional inaccuracies and loss of resolution.

Another advantage of single particle electrical contacts as described in the present invention is the absence of particle alignment requirements and preferred particle-to-particle orientations. For example, application of a magnetic field during manufacturing is not required to orient and align the particles, making manufacturing easier and less costly. In addition, when magnetic alignment is used, the conductive particles span the entire thickness of the resulting film, requiring another insulting layer to be applied so that the overall construction is not conductive in the absence of pressure. The absence of particle alignment requirements can also improve durability relative to devices that employ aligned wires or elongated rods vertically oriented in the thickness direction of the device that can be subject to bending and breaking upon repeated activation and/or relatively high applied forces. The absence of particle alignment and orientation requirements make devices of the present invention particularly suitable for applications where the device is to be mounted in curved, irregular, or otherwise non-flat configurations.

Devices of the present invention can also be made very thin because the gap between the conductors at their rest state (no externally applied pressure) need only be slightly larger than the largest conductive particles disposed between the conductors. As such, relatively low particle loadings can be used while still maintaining reliable performance and sufficient resolution (e.g., when the conductors are patterned). Thin construction and lower particle density can be important in applications where a display or other object is meant to be viewable through the device. The particles can also be distributed so that the activation force (the force required to activate the device) is uniform across the surface of the device and/or so that the visual appearance is relatively uniform across the device. The ability to use lower particle density can also be a cost advantage because fewer particles are used.

Optical properties of devices of the present invention can be improved by completely filling the gap between conductors with the conductive particle and insulating material composite so that substantially no air gaps exist. In applications where light is to be transmitted through the device, the absence of air gaps can improve light transmission. Random distribution and no preferred orientation of particles can be desirable for ease of manufacture as well as optical effects. For example, vertically aligned stacks of particles and vertically aligned wires may reduce visibility of displays or other objects under the device when viewed at high angles.

FIG. 1 shows a pressure activated electronic device that includes a first conductor in the form of a conductive layer 110, a second conductor in the form of a second conductive layer 120, and a gap 130 between the first and second conductive layers. At least one of conductive layers 110 and 120 is movable with respect to the other conductive layer, for example by application of external pressure by a user. Gap 130 includes a composite material having conductive particles wholly or partially embedded in an insulating material. By insulating it is meant that the material is sufficiently less conductive than the particles and the conductors so that the electrical connection made upon application of pressure is not maintained when the applied pressure is released.

Either of the conductive layers 110 or 120 can be a conductive sheet, foil, or coating, that is continuous or patterned (e.g., in the form of a circuit, as a series of lines, bars, or pads, etc.). The material(s) of the conductive layers can include any suitable conductive material such as metals, semiconductors, doped semiconductors, semi-metals, metal oxides, organic conductors and conductive polymers, and the like. Exemplary inorganic materials include copper, gold, and other metals or metal alloys commonly used in electronic devices, as well as transparent conductive materials such as transparent conductive oxides, for example indium tin oxide (ITO), antimony tin oxide (ATO), and the like. Exemplary organic materials include conductive organic metallic compounds as well as conductive polymers such as polypyrrole, polyaniline, polyacetylene, and polythiophene, and materials disclosed in European Patent Publication EP-1-172-831-A2. The conductors can be self-supporting or can be provided on a substrate (not shown in FIG. 1). Suitable substrates can be rigid, for example rigid plastics, glass, metals, or semiconductors, or flexible, for example flexible plastic films, flexible foils, or thin glass. Suitable substrates can be transparent or opaque depending on the application.

Figure 2A:
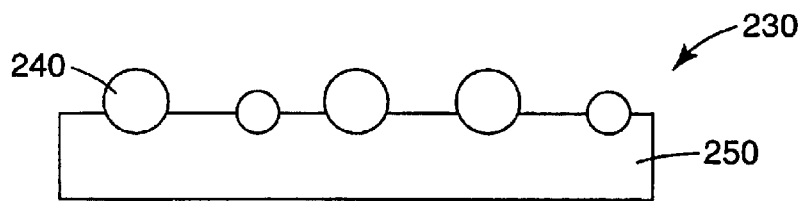
FIGS. 2(a) and (b) are schematic side views of composite materials useful in pressure sensitive electronic devices of the present invention.
Figure 2B:
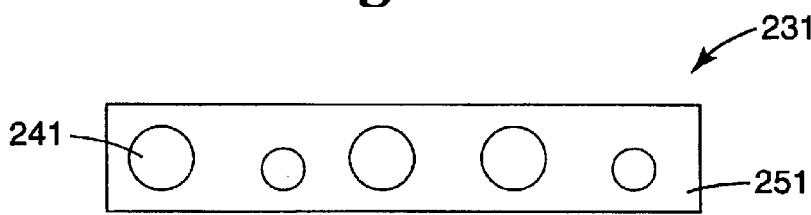

The composite material disposed between the conductors includes conductive particles at least partially embedded in an insulating material. The conductive particles are disposed so that when pressure is applied to the device to move one conductor relative to the other, an electrical connection can be made through single particles contacting both of the conductors. As such, the insulating material preferably has a deformability and resiliency that allows electrical contacts to be made upon the application of pressure and the electrical contacts to be broken when the pressure is released. FIG. 2(a) shows one example of a composite material 230 that includes conductive particles 240 partially embedded in an insulating layer 250. FIG. 2(b) shows an example of another composite material 231 that includes conductive particles 241 completely embedded in an insulating layer 251. While FIGS. 2(a) and (b) serve to illustrate embodiments of a composite material useful in the present invention, any suitable arrangement where conductive particles are embedded fully or partially in any suitable ratio at any suitable position with respect to any particular surface of the insulating layer or material can be used. The present invention does not exclude composite materials having isolated instances where conductive particles overlap in the thickness direction of the device.

Preferably, the largest conductive particles are at least somewhat smaller than the thickness of the layer of insulating material, at least when the particle size is measured in the thickness direction of the composite. This can help prevent electrical shorting of the device.

Exemplary conductive particles include any suitable particles that have a contiguously conductive outer surface. For example, the conductive particles can be solid conductive particles (e.g., metallic spheres), solid particles coated with a conductive material, hollow particles with a conductive outer shell, or hollow particles coated with a conductive material. The conductive material can include metals, conductive metal oxides, organic conductors and conductive polymers, semiconductors, and the like. The core of coated particles can be solid or hollow glass or plastic beads, ceramic particles, carbon particles, metallic particles, and the like. The conductive particles can be transparent, semitransparent, colored, or opaque, can have rough or smooth surfaces, and can be rigid or deformable.

The term "particles" includes spherical beads, elongated beads, truncated fibers, irregularly shaped particles, and the like. Generally, particles include particulate objects that have aspect ratios of 1:1 to about 1:20, and have characteristic dimensions in a range of about 1 to 500 microns, depending on the application. In the present invention, the conductive particles are dispersed in the composite material without any preferred orientation or alignment.

Exemplary insulating materials include those materials that can maintain sufficient electrical separation between the conductors of pressure activated devices of the present invention and that exhibit deformability and resiliency properties that allow the insulating material to be compressed to allow electrical contact of the conductors via one or more single particle contacts and to return the conductors to an electrically separated state when sufficient pressure is no longer being applied between the conductors. It is preferable that both the response time (the time it takes to activate the device upon application of sufficient pressure) and the relaxation time of the device (the time it takes to restore an open circuit upon cessation of sufficient pressure) are sufficiently fast given the particular application so that another input can be registered at the same location within a desirable amount of time. In some applications, it is desirable to allow inputs from rapidly repeated touches. In other applications, it may be desirable to prevent another input at the same location for a short period of time. Elastomeric compositions can provide suitable insulating material properties. Exemplary insulating materials include silicones, polysiloxanes, polyurethane, polysilicone-polyurethanes, rubber, ethylene-vinyl acetate copolymers, phenolic nitrile rubber, styrene butadiene rubber, polyether-block-amides, and polyolefins, as well as various gels and other like materials. For example, gel materials such as those disclosed in U.S. Pat. No. 5,686,705 can be used, particularly in applications where the device is not transparent.

The characteristics of the insulating material and the composite layer can be selected to create, enhance, or tailor various properties of switch devices of the present invention. For example, the activation force of the device can be tailored by adjusting the softness of an elastomer insulating material and/or the thickness of the insulating layer relative to the size of the particles. High activation forces can be useful in providing hand rejection (i.e., not registering a touch input from a user resting a hand, for example, on the device). Low activation forces can be useful when it is desirable to detect low force touch inputs.

In some embodiments, it may be desirable for objects such as displays to be viewable through the pressure activated device of the present invention. Thus, it may be desirable to provide visible light transmissive substrates, conductors, and composite materials. Visible light transmissive composite materials include a substantially clear or transparent insulating material and conductive particles that are either visible light transmissive or provided at loading densities that allow for significant amounts of light to be transmitted through the device. Even in applications where it is desirable to view objects through the device, uniform visual appearance through the device may be more important than maximizing light transmittance.

When a higher light transmittance is desired, significant improvement in light transmittance can be achieved by filling the gap between the conductors with the composite material so that there are substantially no air gaps, and by choosing materials for the insulating material, the conductive coating or other materials of the conductive particles, and/or the materials of the conductors to be sufficiently matched in their respective indices of refraction to allow for greater transmission of visible light. For example, polymeric beads coated with a transparent conductive oxide or a conductive polymer can be disposed in a clear elastomer to form the composite material for inclusion on a device of the present invention, where the indices of refraction and optical properties of the elements of the composite material as well as the conductors and other layers of the device can be selected to provide desirable optical properties, such as increased transmission.

For applications requiring high light transmittance, it is preferred that the composite material wet-out against the clear conductor. For this to occur, it may be advantageous for the beads to be fully embedded in the elastic material so a smooth surface is formed. In addition, in order to retain optical clarity over the lifetime of the switchable pressure activated device, it is preferred that the elastic insulating material have a "self-sealing" property so that punch-through points where the particles break through to make electrical connections do not become visible.

Composite materials can be provided in any suitable manner. Generally, making or providing the composite material involves distributing the conductive particles and at least partially embedding the conductive particles in the insulating material. For example, the particles can first be distributed on a surface and the insulating material coated over, pressed onto, or laminated to the layer of particles. The surface the particles are distributed onto can be a layer of the device, for example one of the conductors, or a carrier substrate that is removed after the particles are embedded into the insulating material. As another example, the particles can be dispersed in the insulating material and the resulting composite can be coated to form the composite material. As still another example, the insulating material can be provided as a layer, for example by coating, and then the conductive particles can be distributed on the layer of insulating material. The particles can be embedded by pressing the particles into the layer of insulating material, with optional heating of the insulating material to allow the insulating material to soften, or by distributing the particles on, and optionally pressing the particles into, the insulating material layer when the insulating material is in an uncured or otherwise softened state and subsequently hardening the insulting material layer by curing, cooling, or the like.

Exemplary methods of dispersing the conductive particles include those disclosed in co-assigned U.S. patent application Ser. No. 10/008,468. Briefly, the particles can be dispensed onto a layer of the insulating material in the presence of an electric field to help distribute the particles as they randomly land on the layer. The particles are electrically charged such that they are mutually repelled, therefore lateral electrical connections and particle agglomeration are substantially avoided. The electric field is also used to create attraction of the particles to the film. Such a method can produce a random, non-aggregating distribution of conductive particles. The particles can be applied at a preselected density with a relatively uniform (number of particles per unit area) distribution of particles. Also, the web can be buffed to further aid in the particle distribution.

Other methods of dispersing the conductive particles can also be used. For example, the particles can be deposited in the pockets of micro-replicated release liner as disclosed in International Publication WO 00/00563. The insulating material would then be coated on or pressed against this particle-filled liner. Any other method for distributing or dispersing the particles can be used provided that the particles are so distributed in the composite material that substantially all electrical contacts made between the conductors of the pressure activated device are through one or more single particle contacts. As such, care should be taken to reduce or eliminate the occurrence of stacked particles in the composite, that is two or more particles having overlapping positions in the thickness direction of the composite. Preferably, care may be taken to reduce or eliminate the inclusion or formation of air bubbles for any method of introducing the particles to the insulating material.

The methods used to place particles onto the medium should ensure that the contact between particles in the in-plane (x-y) direction is minimized. Preferably no more than two particles should be in contact and more preferably no two particles are in contact with each other. This will prevent any electrical shorting in the in-plane direction due to particle contact, and is especially preferred when the application requires multiple closely spaced electrodes.

Figure 3A:
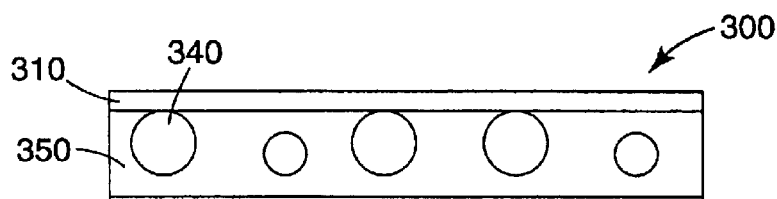
FIGS. 3(a) and (b) are schematic side views of a membrane switch incorporating a pressure sensitive electronic device of the present invention.
Figure 3B:
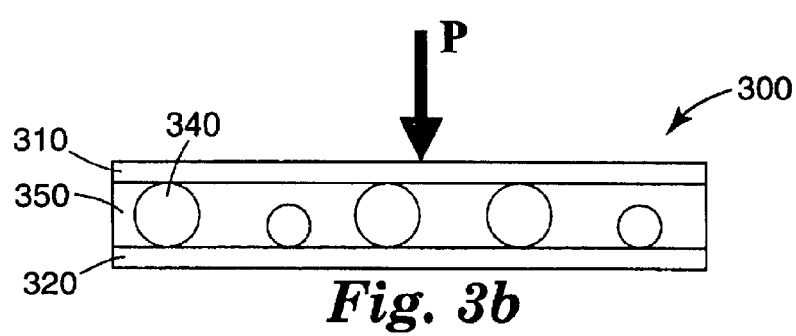

FIGS. 3(a) and 3(b) illustrate the use of a device of the present invention in an exemplary membrane switch in which electrical contact is achieved by physical contact through one or more single particles. Membrane switch 300 includes a first conductor 310, a second conductor 320, and conductive particles 340 in an insulating matrix 350 disposed between the conductors. As shown in FIG. 3(a), when no pressure is applied between the conductors, the conductors remain electrically isolated by the insulating material. As shown in FIG. 3(b), when sufficient pressure P is applied to the first conductor 310, an electrical contact can be made between the first and second conductors via single particle contacts. Single particle contacts are those electric contacts between the first and second conductors where one or more single conductive particles individually contact both the first and the second conductors.

The conductive particles may have a size distribution such that the particles are not identical in size (or shape). In these circumstances, the larger conductive particles can make electrical contact before, or even to the exclusion of, smaller neighboring particles. Whether and to what extent this occurs depends on the size and shape distribution of the particles, the presence or absence of particle agglomeration, the loading density of the particles, the ability for the movable conductor (or movable conductor/substrate combination) to flex and conform to local variations, the deformability of the particles, the deformability of the insulating medium in which the particles are embedded, and the like. As such, these and other properties can be adjusted so that a desirable number of single particle electrical contacts per unit area are made when sufficient pressure is applied between the first and second conductors. For example, when the conductors are patterned (for example, when the conductors represent discrete lines), it may be desirable for the average spacing of single particle contacts upon application of sufficient pressure is at least somewhat less than the circuit spacing dimensions so that at least one, and preferably more than one, single particle contacts can be made between overlapping portions of the respective conductor patterns.

In some embodiments, it may be preferable for the particle size distribution to be relatively narrow, and in some circumstances it may be preferable that all the particles are substantially the same size. In some embodiments, it may be desirable to have a bi-modal distribution of particle sizes. For example, it may be desirable to have two different types of particles, larger particles and smaller particles, dispersed in the composite material. In one embodiment that includes a bimodal distribution of particles, the larger particles can be of low conductivity and the smaller particles can be of higher conductivity, and the particles distributed in such a manner that low force touches cause electrical connections via the larger particles and high force touches cause additional electrical connections via the smaller particles. Signals from the low force touches would thus be distinct from the signals generated by higher force touches. A touch sensor using a composite material with such a bimodal particle distribution might be used to be able to highlight an icon, for example, at low touch forces and to open the program represented by the icon by applying a higher touch force at the same location, thus performing a kind of double-click operation by simply applying additional force at the same location.

Figure 4A:
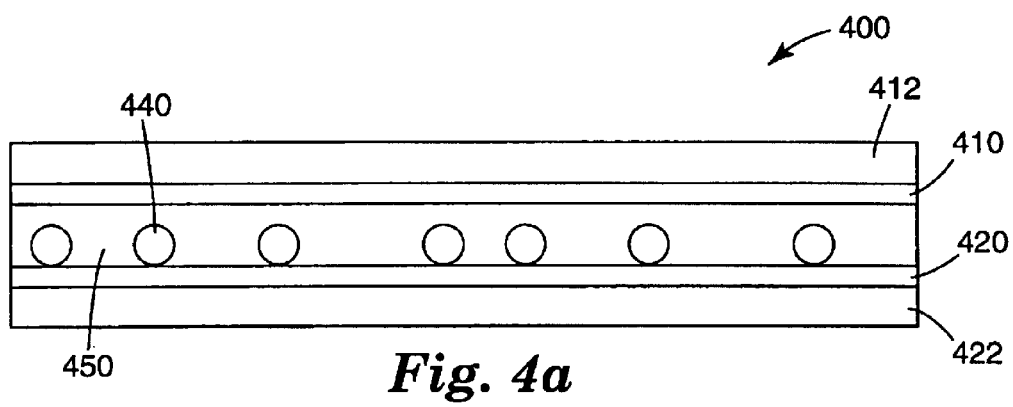
FIGS. 4(a) and (b) are schematic side views of a touch panel incorporating a pressure sensitive electronic device of the present invention.
Figure 4B:
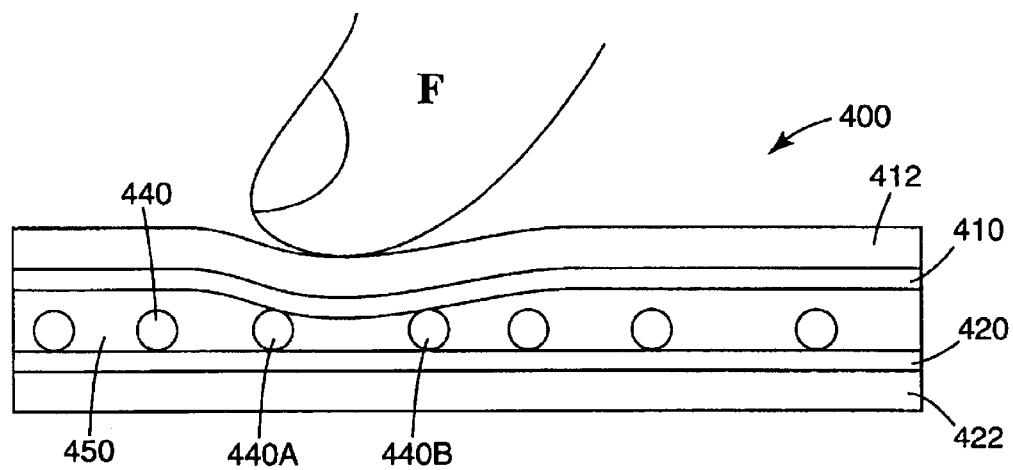

FIGS. 4(a) and 4(b) illustrate the use of a device of the present invention in an exemplary resistive touch panel 400. Touch panel 400 includes a first conductive layer 410 on a flexible substrate 412, a second conductive layer 420 on a substrate 422, and a composite material disposed between the conductive layers, the composite material including conductive particles 440 in an insulating matrix 450. As shown in FIG. 4(a), the conductive layers are electrically separated when no touch force is being applied. As shown in FIG. 4(b), application of a touch force from a finger F (or stylus or other object) asserts a local pressure on flexible substrate 412 under which substrate 412 and conductive layer 410 can be locally moved toward conductive layer 420. Upon application of sufficient force, electrical contact between conductive layers 410 and 420 can be achieved through one or more single particle contacts. As shown, electrical contact is made between the conductive layers via single particle contacts with particles 440A and 440B. Removing the finger or other object allows substrate 412 and conductive layer 410 to return to a position where the conductive layers are again electrically isolated.

Figure 5A:
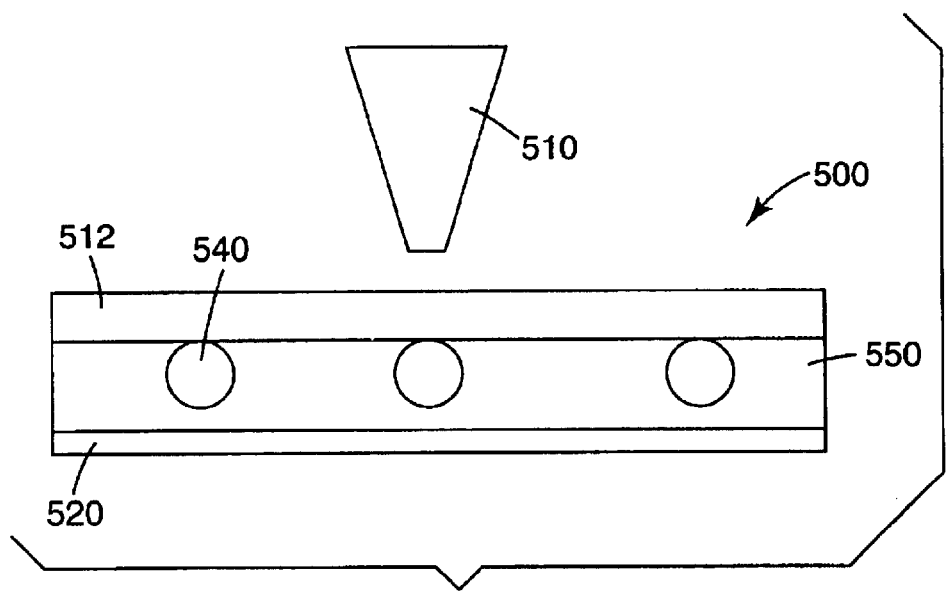
FIGS. 5(a) and (b) are schematic side views of another embodiment of a switchable pressure activated device according to the present invention.
Figure 5B:
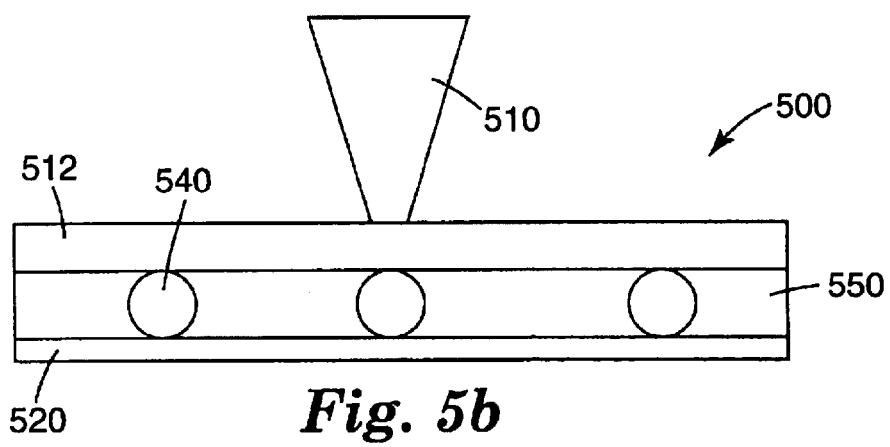

FIGS. 5(a) and 5(b) illustrate one embodiment where the single particle electrical connections are made via capacitive coupling of the conductors. FIG. 5(a) shows a switchable pressure activated device 500 that includes a bottom conductor 520, a top insulating substrate 512, and conductive particles 540 disposed in an insulating material 550 between conductor 520 and substrate 512. The top conductor 510 is the object used to apply the pressure to activate the device, and can be any object that is capable of conducting electricity, for example a conductive stylus tethered to the device, an un-tethered conductive stylus held in a user's hand, a finger, or other such object. As shown in FIG. 5(b), application of pressure from conductive touch implement 510 brings the conductive particles into contact with conductor 520 and also sufficiently reduces the distance between conductive touch implement 510 and conductive particles 540 so that a capacitive coupling can be made and a signal can be generated in the device.

Figure 6:
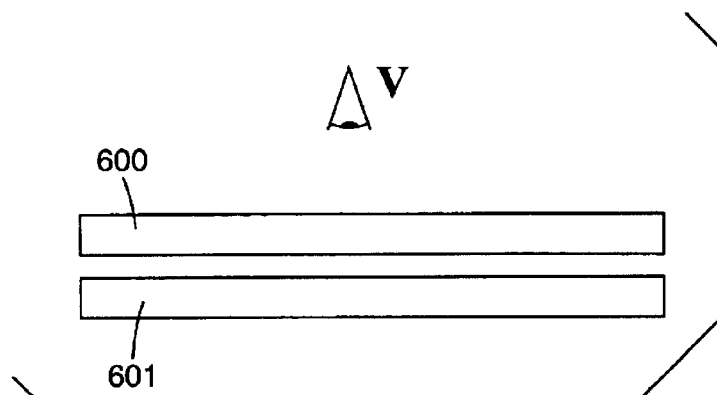
FIG. 6 is a schematic side view of a pressure sensitive electronic device associated with a display element.

FIG. 6 shows a pressure activated electronic device 600 adapted for use with a display element 601. Pressure activated electronic device 600 includes a composite material that has conductive particles at least partially embedded in an insulating material, the conductive particles and insulating material being transmissive of visible light and sufficiently refractive index matched to allow a viewer V to view the display element 601 through the device 600. Display 601 can include permanent or replaceable graphics (for example, pictures, maps, icons, and the like) as well as electronic displays such as liquid crystal displays, cathode ray tubes, plasma displays, electroluminescent displays, organic electroluminescent displays, electrophoretic displays, and the like.

In other embodiments, the display element or graphics can be disposed over the switchable device, and the device need not be transparent. When disposed over the switchable device, the display element can be permanent (such as with printed graphics or other indicia) or can be changeable (for example, a removable overlay).

Most resistive touch screens include an air gap and spacer dots disposed between clear conductive layers. Filling this gap with a filler material can provide improvements in visual appearing of the touch screen. The clear conductive layers are commonly made from ITO or another transparent conductive oxide, and these materials have high refractive indices, resulting in a high amount of reflection in touch screens that have air gaps between the conductors. Filling the gap with a material can be used to eliminate the air gap and provide better transmission through the device. Filling the gap can provide other advantages such as increasing durability due to the protection that a filler material provides to the transparent conductive layers that are otherwise prone to cracking and flaking that reduces the lifetime of the device.

Figure 7:
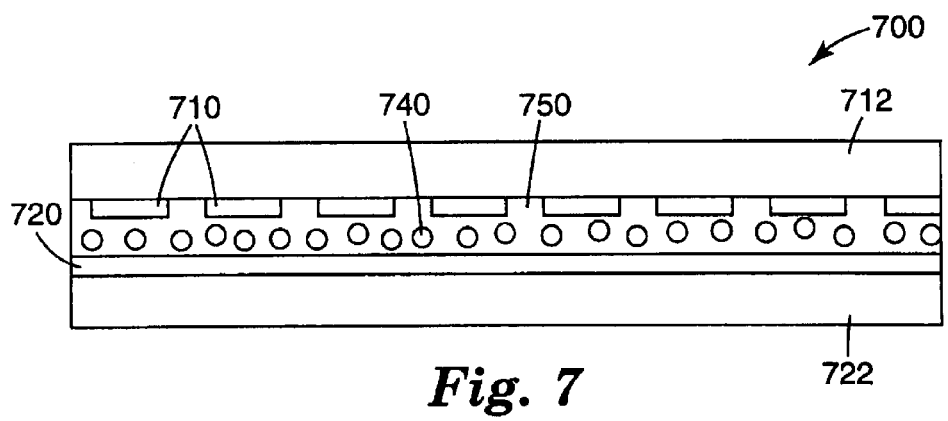
FIG. 7 is a schematic side view of a touch panel incorporating a pressure sensitive electronic device of the present invention.

FIG. 7 shows another embodiment of an electronic device of the present invention for use in a touch panel application. Touch panel 700 includes a top substrate 712, a conductive layer patterned into a series of parallel conductive bars 710 disposed on the top substrate 712, a bottom substrate 722 having a series of parallel conductive bars 720 oriented orthogonally to bars 710, and a composite material disposed between the substrates and conductive bars, the composite material including an insulating material 750 and conductive particles 740. The conductive particles are distributed and have sizes and local densities such that the application of a sufficient touch force from a finger, stylus, or other suitable object can electrically connect one of the top conductive bars 710 to one of the bottom conductive bars 720 via one or more single particle contacts. By detecting a current flow between the connected bars, the systems can determine the location of the applied touch. Touch panel 700 can be made transparent or opaque.

The device shown in FIG. 7 can analogously be used as an array or assembly of membrane switches. As such, it is possible to make multiple switches placed in any desired distribution without requiring separate elements such as die cut spacer layers to define the position of the switch. Further, the alignment requirements for registering top and bottom electrodes for the switches can be relaxed. The present invention thus provides additional freedom in designing and placing membrane switches.

Figure 8:
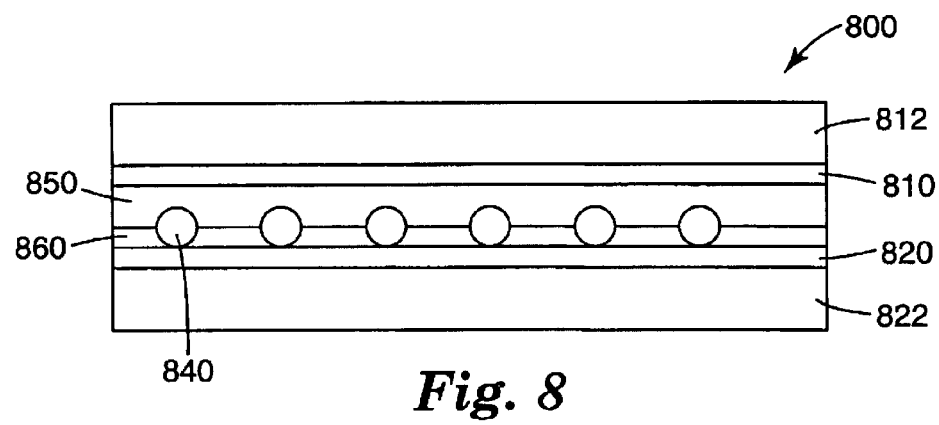
FIG. 8 is a schematic side view of another embodiment of a switchable pressure activated device according to the present invention.

FIG. 8 shows another embodiment of a device according to the present invention. Switchable device 800 includes a conductor 810 disposed on substrate 812 and another conductor 820 disposed on substrate 822. Either conductor 810 or conductor 820 can be movable toward the other conductor. Disposed between the conductors 810 and 820 are conductive particles 840 partially embedded in a resilient, deformable insulating material 850 and partially embedded, and anchored by, a rigid insulating layer 860. Rigid layer 860 can be used to anchor the positions of the conductive particles to reduce shifting over time, potentially resulting in more consistent and reproducible electrical contacts, and therefore more reproducible signals. The device shown in FIG. 8 can be modified so that the conductive particles are partially embedded in a layer of rigid material with at least a portion of each particle exposed on each side of the rigid material. In this case, resilient, deformable insulating material can be disposed between the lower conductor and the rigidly anchored conductive particles and between the upper conductor and the rigidly anchored conductive particles.

EXAMPLES

Example 1

A membrane switch was constructed by using the process disclosed in U.S. patent application Ser. No. 10/008,468 to distribute silvered glass beads onto a 50 micron thick layer of a hot melt adhesive. The silvered glass beads were those commercial available from Potters Industries, Valley Forge, Pa., under the trade designation Conduct-O-Fill™ S-3000-S3P. The silvered glass beads had a mean diameter of 43 microns. The hot melt adhesive was a 50:50 mixture of a resin available from Elf Atochem, Philadelphia, Pa., under the trade designation Pebax 3533, and a tackifier resin available from Arizona Chemical, Panama City, Fla., under the trade designation Nirez 2040. The mixture was thermally extruded to a 50 micron thickness, and the silvered glass beads were distributed thereon to form the composite material. The average density of distributed beads was about 140 per $mm^2$.

The composite material was then sandwiched between two copper foils, each being 100 microns thick. The construction was then adhered to a glass slide for mechanical support. No electrical shorts were found due to particles contacting both conductive layers after assembly.

The two copper foils were connected to an ohmmeter and the resistance between them was monitored as the top copper foil was pressed with a finger. The resistance of the switch in the "off" state when no pressure was applied was greater than 200 MΩ, and the resistance of the switch in the "on" state when pressed with a finger was less than 1 Ω. The switching cycle was repeated over 500 times and the switch remained functional.

Example 2

A membrane switch was constructed as in Example 1, except that the silvered beads were dispensed onto a 50 micron thick knife coated layer of a silicone material commercially available from Dow Corning, Midland, Mich., under the trade designation Silicone 734. The beads were dispensed on the silicone layer immediately after the layer was coated onto its release liner. The average density of distributed beads was about 140 per mm$^2$. The silicone and beads were placed in an oven at 60° C. for about 2 hours to cure the silicone and to allow the beads to sink into the silicone layer. After curing, the composite was peeled off the liner and sandwiched between two 100 micron thick copper foils as in Example 1. No electrical shorts were found due to particles contacting both conductive layers after assembly.

A mechanical point contact activation device was constructed to carry out repeated testing of the membrane switch. A D.C. motor driven plunger was fitted with a circular silicone rubber pad having a diameter of 11 mm, commercially available from 3M Company, St. Paul, Minn., under the trade name Bumpon™. The plunger was used to activate the switch, the silicone rubber pad being in contact with the top copper foil. The weight of the plunger and pad was 104 grams. The motor was set to activate the switch four times per second by lifting the plunger off the switch a short distance and then releasing the plunger, allowing the weight of the plunger to put pressure on the switch to activate it.

The resistance of the switch in the "on" state was about 1 Ω and the resistance of the switch in the "off" state was greater than 20 MΩ. The switch was activated more than 1.266 million cycles without noticeable deterioration of the performance.

Example 3

A membrane switch identical to the one made in Example 2 was constructed, except that the thickness of the silicone layer was about 35 microns. No electrical shorts were found due to particles contacting both conductive layers after assembly. The switch was activated by very light finger touch. The switch was shown to activate with a 25 gram weight having a footprint of 78 mm$^2$. The resistance of the switch in the "on" state was about 1 Ω and the resistance of the switch in the "off" state was greater than 20 MΩ.

Example 4

A membrane switch identical to the one made in Example 2 was constructed except that a 50 micron thick nitrile rubber film commercially available from 3M Company, St. Paul, Minn., under the trade designation 3M Scotch-Weld Bonding Film 538 was used in place of the silicone material. The resulting switch required about 500 grams over an area on the order of 1 cm$^2$ for activation. The resistance of the switch in the "on" state was about 1 Ω and the resistance of the switch in the "off" state was greater than 20 MΩ.

Example 5

A transparent touch sensor device was made. First, 43 micron diameter Ag-coated glass beads were distributed on a 50 micron thick layer of a clear silicone material commercially available from Dow Corning, Midland, Mich., under the trade designation RTV734 Clear. The beads were distributed as in Example 1. The silicone layer was then cured. The composite was then placed between two sheets of about 25 micron thick PET coated with ITO, the ITO layers of the sheets facing each other. The PET sheets also had silver traces to make electrical connections to a controller, for example. A small area of the device was left open (i.e., no composite material between the ITO layers) for comparison.

A digital volt meter was attached to a silver trace on each side of the construction. A commonly available stylus such as those used with handheld computer devices like those available from Palm Inc., Santa Clara, Calif., under the trade designation Palm™ was used to apply a touch force to the construction. Application of a touch force from the stylus to the "open" area to make a direct ITO to ITO contact resulted in a resistance of about 2000–8000 Ω. Application of a touch force from the stylus in an area having the composite material so that ITO to ITO electrical connections were made through one or more single particle contacts also resulted in a resistance of about 2000–8000 Ω. The device was touched over thirty times and the composite material caused reversible switching between insulating ("off" state) and conducting ("on" state).

The touch sensor was also tested by connecting it to a resistive touch sensor controller commercially available from 3M Touch Systems, Inc., Methuen, Mass. The controller was able to register a touch when the stylus was used to touch the sensor in the area with the composite material between the ITO coatings.

Example 6

Free-standing films of the clear silicone used in the above Examples dispersed with conductive particles were made to test the clarity achievable for composite materials useful in the present invention.

ITO-coated glass beads having an average diameter (D) of 63 microns were dispersed in the clear silicone (average particle density of 15 particles per mm$^2$), and a free-standing composite film having a thickness (d) of about 78 microns was made. Another free-standing composite film was made with the clear silicone and containing the silvered glass beads used in the above Examples (average diameter (D) of 43 microns, particle density of 140 particles per mm$^2$), the film thickness (d) being about 60 microns. A third free-standing composite film was made with the clear silicone and containing the silvered glass beads used in the above Examples (average diameter (D) of 23 microns, particle density of 80 particles per mm$^2$), the film thickness (d) being about 37 microns. The films were then measured for total transmittance ($T_T$) of visible light (average transmission over a wavelength range of 400 nm to 700 nm), and total reflection ($R_T$) of visible light (average reflection over a wavelength range of 400 nm to 700 nm). The results are reported in Table I.

TABLE I

|  | d (μm) | D (μm) | T_T (%) | R_T (%) |
|---|---|---|---|---|
| First Film (ITO coated beads) | 78 | 63 | 85.9 | 15.6 |
| Second Film (silver coated beads) | 60 | 43 | 91.0 | 10.8 |
| Third Film (silver coated beads) | 37 | 23 | 92.0 | 9.4 |

Due to experimental error, the reported transmission and reflection are accurate to within 2%. The results indicate that highly transmissive composite materials can be made, and that there is an insignificant amount of light absorption.

The present invention should not be considered limited to any particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

Each of the patents, patent documents, and publications cited above is hereby incorporated into this document as if reproduced in full.

What is claimed is:

1. A switchable pressure activated electronic device comprising:
   a first conductor that is movable toward a second conductor; and
   a composite material disposed between the first and second conductors for electrically connecting the first and second conductors under application of sufficient pressure therebetween and for electrically isolating the first and second conductors in the absence of such sufficient pressure,
   the composite material comprising a plurality of conductive particles randomly positioned and at least partially embedded in an electrically insulating elastomeric layer,
   the plurality of conductive particles having no intended relative orientation and being disposed so that substantially all electrical connections made between the first and second conductors are through single particles.

2. The device of claim 1, wherein the switchable pressure activated electronic device comprises a membrane switch.

3. The device of claim 1, wherein the switchable pressure activated electronic device comprises an array of membrane switches, each of said membrane switches being independently activatable.

4. The device of claim 1, wherein the switchable pressure activated electronic device comprises a touch sensor.

5. The device of claim 1, wherein the first and second conductors comprise sheets or coatings of conductive material.

6. The device of claim 5, wherein the first and second conductors are disposed on first and second substrates, respectively.

7. The device of claim 6, wherein at least one of the first and second substrates is flexible.

8. The device of claim 6, wherein at least one of the first and second substrates is rigid.

9. The device of claim 6, wherein at least one of the first and second substrates is transparent.

10. The device of claim 5, wherein the first and second conductors are transparent.

11. The device of claim 1, wherein at least one of the first and second conductors comprises a transparent conductive oxide.

12. The device of claim 1, wherein at least one of the first and second conductors comprises a metal.

13. The device of claim 1, wherein at least one of the first and second conductors comprises an organic conductor.

14. The device of claim 1, wherein at least one of the first and second conductors is patterned.

15. The device of claim 1, wherein at least one of the first and second conductors comprises a circuit.

16. The device of claim 1, wherein the composite material is disposed between the first and second conductors so that substantially no air gaps exist between the first and second conductors.

17. The device of claim 1, wherein the electrically insulating layer is transparent to visible light.

18. The device of claim 1, wherein the electrically insulating layer comprises a silicone material.

19. The device of claim 1, wherein the conductive particles are substantially spherical.

20. The device of claim 1, wherein the conductive particles comprise a metal.

21. The device of claim 1, wherein the conductive particles comprise core particles having a conductive coating.

22. The device of claim 21, wherein the conductive coating comprises a metal.

23. The device of claim 21, wherein the conductive coating comprises a transparent conductive oxide.

24. The device of claim 21, wherein the conductive coating comprises an organic conductor.

25. The device of claim 21, wherein the core particles comprise glass particles.

26. The device of claim 21, wherein the core particles comprise hollow particles.

27. The device of claim 1, wherein the conductive particles are transparent.

28. The device of claim 1, wherein the conductive particles are semi-transparent.

29. The device of claim 1, wherein the conductive particles are colored.

30. The device of claim 1, wherein the conductive particles are opaque.

31. The device of claim 1, wherein the conductive particles are deformable.

32. The device of claim 1, wherein the conductive particles are substantially the same size.

33. The device of claim 1, wherein the conductive particles exhibit a bi-modal size distribution.

34. The device of claim 1, wherein the first conductor comprises a conductive stylus.

35. The device of claim 1, further comprising graphics or indicia.

36. The device of claim 1, further comprising a display element viewable through the conductors and composite material.

37. A switchable pressure activated electronic device comprising:
   a composite layer comprising a plurality of substantially spherical conductive particles randomly positioned and disposed so that substantially none of the conductive particles are in mutual physical contact, and wherein, for substantially all positions across the layer, there is at most a single particle through the thickness of the layer,
   the composite layer being disposed between two conductors and having a thickness that reversibly decreases upon application and cessation of sufficient force applied between the conductors to allow electrical connection of the conductors through one or more of the conductive particles during application of sufficient force and to allow electrical isolation of the conductors during cessation of sufficient force.

38. A method of making a switchable pressure activated electronic device comprising:

dispersing a plurality of conductive particles;

at least partially embedding the conductive particles in a layer of insulating material; and disposing the layer of insulating material and conductive particles between a first conductor and a second conductor so that the first and second conductors are electrically connected through one or more single particle contacts upon application of sufficient pressure, and the first and second conductors are electrically isolated upon cessation of sufficient pressure, wherein the step of dispersing the plurality of conductive particles comprises charging the particles so that the particles mutually repel and dispensing the particles on a surface.

39. The method of claim 38, wherein the surface is a surface of the layer of insulating material.

40. A method of making a switchable pressure activated electronic device comprising:

dispersing a plurality of conductive particles;

at least partially embedding the conductive particles in a layer of insulating material; and disposing the layer of insulating material and conductive particles between a first conductor and a second conductor so that the first and second conductors are electrically connected through one or more single particle contacts upon application of sufficient pressure, and the first and second conductors are electrically isolated upon cessation of sufficient pressure, wherein at least partially embedding the conductive particles in the layer of insulating material comprises pressing the conductive particles into the layer of insulating material.

41. A method of making a switchable pressure activated electronic device comprising:

dispersing a plurality of conductive particles;

at least partially embedding the conductive particles in a layer of insulating material; and disposing the layer of insulating material and conductive particles between a first conductor and a second conductor so that the first and second conductors are electrically connected through one or more single particle contacts upon application of sufficient pressure, and the first and second conductors are electrically isolated upon cessation of sufficient pressure, wherein at least partially embedding the conductive particles in the layer of insulating material comprises heating the layer of insulating material to allow the conductive particles to sink into a surface of the layer of insulating material.

42. A method of making a switchable pressure activated electronic device comprising:

dispersing a plurality of conductive particles;

at least partially embedding the conductive particles in a layer of insulating material; and disposing the layer of insulating material and conductive particles between a first conductor and a second conductor so that the first and second conductors are electrically connected through one or more single particle contacts upon application of sufficient pressure, and the first and second conductors are electrically isolated upon cessation of sufficient pressure, wherein the steps of dispersing the conductive particles and embedding the conductive particles in a layer of the insulating material comprises dispersing the conductive particles in a liquid precursor of the insulating material to form a coatable composite, coating the coatable composite to form a composite layer, and hardening the liquid precursor to form the insulating layer having the conductive particles dispersed therein.

43. A film for use in an electronic switch, the film comprising an electrically insulating elastomeric layer having a thickness that reversibly decreases with pressure, and a plurality of randomly positioned conductive particles at least partially embedded in said layer, wherein, for substantially all positions across the layer, there is at most a single particle through the thickness of the layer.

44. A switchable pressure activated electronic device comprising:

a first conductor that is movable toward a second conductor; and a composite material disposed between the first and second conductors for electrically connecting the first and second conductors under application of sufficient pressure therebetween and for electrically isolating the first and second conductors in the absence of such sufficient pressure, the composite material comprising a bi-modal size distribution of conductive particles at least partially embedded in an electrically insulating layer, the plurality of conductive particles having no intended relative orientation and being disposed so that substantially all electrical connections made between the first and second conductors are through single particles.

45. A switchable pressure activated electronic device comprising:

a conductive layer; and a composite material disposed over the conductive layer for electrically connecting a conductive stylus to the conductive layer under application of sufficient pressure by the conductive stylus on the composite material and for electrically isolating the conductive stylus from the conductive layer in the absence of such sufficient pressure, the composite material comprising a plurality of conductive particles at least partially embedded in an electrically insulating layer, the plurality of conductive particles having no intended relative orientation and being disposed so that substantially all electrical connections made between the conductive stylus and the conductive layer are through single particles.

* * * * *